(12) United States Patent
Chen

(10) Patent No.: US 6,246,694 B1
(45) Date of Patent: Jun. 12, 2001

(54) METHOD FOR SELECTING BAUD RATES FOR A RATE ADAPTIVE DIGITAL SUBSCRIBER LINE MODEM

(75) Inventor: Walter Y. Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/057,359

(22) Filed: Apr. 8, 1998

Related U.S. Application Data

(60) Provisional application No. 60/043,867, filed on Apr. 9, 1997.

(51) Int. Cl.[7] .................................................... H04J 3/22
(52) U.S. Cl. .......................... 370/468; 370/465; 375/222
(58) Field of Search ..................................... 370/281, 295, 370/465, 468; 375/222, 261, 223, 219

(56) References Cited

U.S. PATENT DOCUMENTS 5,987,069 * 11/1999 Furukawa et al. .................... 370/281
6,167,095 * 12/2000 Furukawa et al. .................... 370/468

* cited by examiner

Primary Examiner—Salvatore Cangialosi
(74) Attorney, Agent, or Firm—Warren L. Franz; Wade James Brady, III; Frederick J. Telecky, Jr.

(57) ABSTRACT

Baud rates for Rate Adaptive Digital Subscriber Line (RADSL) are provided. Optimal baud rates are about 200 KHz apart for loops with an 1 kft length difference. By adapting a set of baud rates with 200 KHz spacing a performance within 0.5 dB of the optimal performance may be maintained.

5 Claims, 4 Drawing Sheets

METHOD FOR SELECTING BAUD RATES FOR A RATE ADAPTIVE DIGITAL SUBSCRIBER LINE MODEM

This application claims priority under 35 USC §119(e)(1) of provisional application Ser. No. 60/043,867 filed Apr. 9, 1997, the entirety of which is incorporated herein by reference.

TECHNICAL FIELD OF THE INVENTION

This invention relates to rate adaptive digital subscriber line modems.

BACKGROUND OF THE INVENTION

Different transmission throughputs or baud rates have been proposed for Rate Adaptive Digital Subscriber Line (RADSL). K. Sistanizadeh, J. Waldhuter, H. Suyderhoud, and M. Sorbara, *Recommendation on Symbol Rates, Constellations, and Spectral Placement and Shaping for the CAP/QAM Spec.*, Joint T1E1 CAP/QAM RADSL Ad Hoc Group Contribution, T1E1/97-134, Mar. 5, 1997; H. Samueli, R. Joshi, M. Darveau, and R. Carsten, *Draft PMD Specification for Rate-Adaptive ADSL (RADSL)*, Broadcom T1E1 CAP/QAM RADSL Ad Hoc Group Contribution, T1E1/97-013, Jan. 22–23, 1997. H. Samueli, R. Joshi, M. Darveau, and R. Carsten, *Draft PMD Specification for Rate-adaptive ADSL (RADSL)*, Broadcom T1E1 CAP/QAM RADSL Ad Hoc Group Contribution, T1E1/97-013, Jan. 22–23, 1997. There was a concern that the currently proposed throughput step size was too big. R. A. McDonald, "*Transceiver Rate Adaptation Step Sizes*," Pacific Bell Telesis Technologies Laboratory T1E1 CAP/QAM RADSL Ad Hoc Group Contribution, T1E1/97-019, Jan. 22–23, 1997.

The relationship between baud rates and a fixed system clock is first explored.

Baud Rates Derived from A Fixed Master Clock

Baud rates $f_{B_i}$ are usually derived from a fixed common clock frequency $f_{clock}$ according to $$f_{B_i} = f_{clock}/m_i$$

where m is an integer. A shift register of n bits, where $\text{Max}(m_i) < 2^n$, is necessary to derive the baud rate from the master clock.

For the proposed baud rates from Globspan Table 1, we have $f_{clock}=114.24$ MHz, $m_1=840$, $m_2=336$, $m_3=168$, $m_4=140$, $m_5=120$, $m_6=105$. K. Sistanizadeh, J. Waldhuter, H. Suyderhoud, and M. Sorbara, *Recommendation on Symbol Rates, Constellations, and Spectral Placement and Shaping for the CAP/QAM Spec.*, Joint T1E1 CAP/QAM RADSL Ad Hoc Group Contribution, T1E1/97-134, Mar. 5, 1997.

TABLE 1

Proposed Baud Rates from GlobSpan

| | Up | | Downstream | | | |
|---|---|---|---|---|---|---|
| Baud Rate | 136 | 340 | 680 | 816 | 952 | 1088 |

For the proposed baud rates from Broadcom

In Table 2, we have $f_{clock}=2.016$ MHz, $m_1=24$, $m_2=16$, $m_3=8$, $m_4=4$, $m_5=3$, $m_6=2$. H. Samueli, R. Joshi, M. Darveau, and R. Carsten, *Draft PMD Specification for Rate-Adaptive ADSL (RADSL)*, Broadcom T1E1 CAP/QAM RADSL Ad Hoc Group Contribution, T1E1/97-013, Jan. 22–23, 1997

TABLE 2

Proposed Baud Rates from Broadcom

| | Up | | Downstream | | | |
|---|---|---|---|---|---|---|
| Baud Rate | 84 | 126 | 252 | 504 | 672 | 1008 |

SUMMARY OF THE INVENTION

In one aspect, the present invention provides a variable throughput step size depending on the baud rate used in conjunction with use of a fractional bit constellation. An optimal baud rate and constellation size identification procedure is identified that may be used in an initialization process. Optimal baud rates have been examined for different length twisted pair telephone loops and optimal baud rates have been found to be about 200 KHz apart for loops with an 1 kft length difference. It has also been found that by employing a set of baud rates with 200 KHz steps, it is possible to maintain a performance within 0.5 dB of an optimal performance. A representation set of baud rates are provided for RADSL.

A method of operating a CAP-RADSL system, is provided that determines a finite set of baud rates for a CAP-RADSL system based on a performance criterion, and selects one of the baud rates based on operating environment, including channel conditions and network synchronization requirements.

These and other features of the invention will be apparent to those skilled in the art from the following detailed description of the invention, taken together with the accompanying drawings.

DETAILED DESCRIPTION OF THE INVENTION

It is desirable for the upstream baud rate of an RADSL system to be selected so that the upstream transmission throughput can maintain a minimum of around 384 kbps on resistance design loops under ISDN basic rate access NEXT noise.

Figure 1:
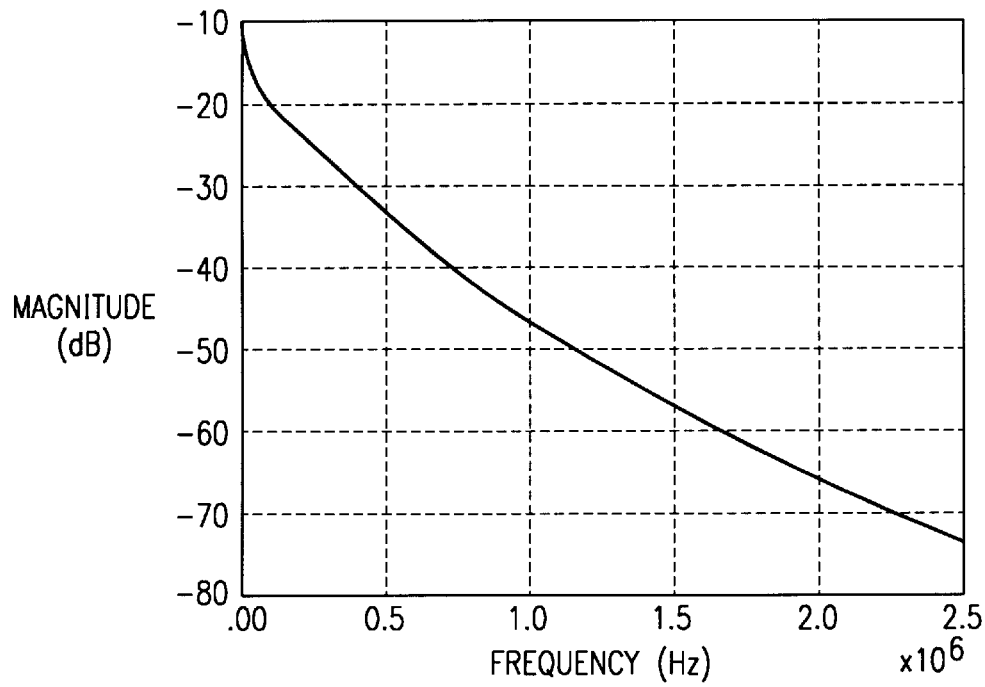
FIG. 1 shows a mid-CSA test loop.

In the downstream direction the baud rate can be extended to cover a maximum frequency of about 2.2 MHz as indicated by the 70 dB loss point of the transfer function of the mid-CSA test loop depicted in FIG. 1. The frequency corresponding to the 70 dB channel loss has been identified as the usable channel bandwidth for the resistance design loop and CSA loop.

Performance on Variable Length Loops

The performance of a CAP ADSL can be estimated based on minimum mean square error (MMSE) of a DFE, assuming the equalizer has a sufficient number of filter coefficients.

The MMSE of a DFE under the combination of FEXT and white background noise is $$\varepsilon_{min} = \exp\left(-\frac{1}{F_2-F_1}\int_{F_1}^{F_2}\ln\left(1+\frac{1}{8\times 10^{-20}tf^2 + \frac{N}{S^2|H(f)|^2}}\right)df\right)$$

where the integration bandwidth corresponds to the signaling baud rate, i.e.

$$\frac{1}{T} = F_2 - F_1.$$

The corresponding SNR at the output of the DFE is $$SNR = \frac{1-\varepsilon_{min}}{\varepsilon_{min}} \approx \frac{1}{\varepsilon_{min}}$$

On the other hand, the required constellation size, M, is related to the baud rate, $$\frac{1}{T},$$

and the target transmission throughput, $R_b$, according to $$M = 2^{R_b T}$$

The required $SNR_r$ for that M value under a defined error rate is $$SNR_r = \frac{\sigma^2}{3}(M-1) = \frac{\sigma^2}{3}(2^{R_b T}-1)$$

where $\sigma^2$ is related to the defined error rate. For a defined error rate of $10^{-7}$, one finds the value of $\sigma$ to be 5.333 according to the Gaussian distribution:

$$10^{-7} = \frac{2}{\sqrt{2\pi}}\int_\sigma^\infty e^{\frac{x^2}{2}}dx$$

The performance margin is then $$SNR_m = SNR - SNR_r$$

Figure 2:
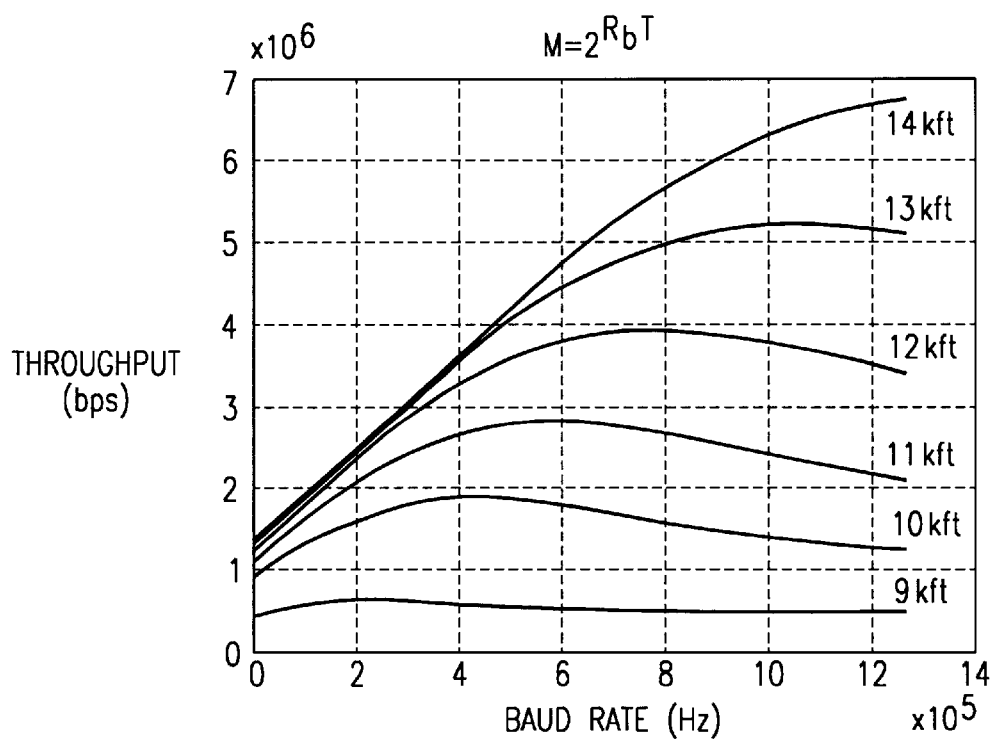
FIG. 2 shows optimal baud rates with HDSL NEXT (240 KHz)

FIG. 2 shows transmission throughputs under different baud rates for 26 gauge twisted pair loops of length 9 kft, 10 kft, 11 kft, 12 kft, 13 kft, and 14 kft for a Frequency Division Duplex (FDD) CAP ADSL system with a lower corner frequency of 240 KHz (as proposed by Globspan). K. Sistanizadeh, J. Waldhuter, H. Suyderhoud, and M. Sorbara, *Recommendation on Symbol Rates, Constellations, and Spectral Placement and Shaping for the CAP/QAM Spec.*, Joint T1E1 CAP/QAM RADSL Ad Hoc Group Contribution, T1E1/97-134, Mar. 5, 1997.

Figure 3:
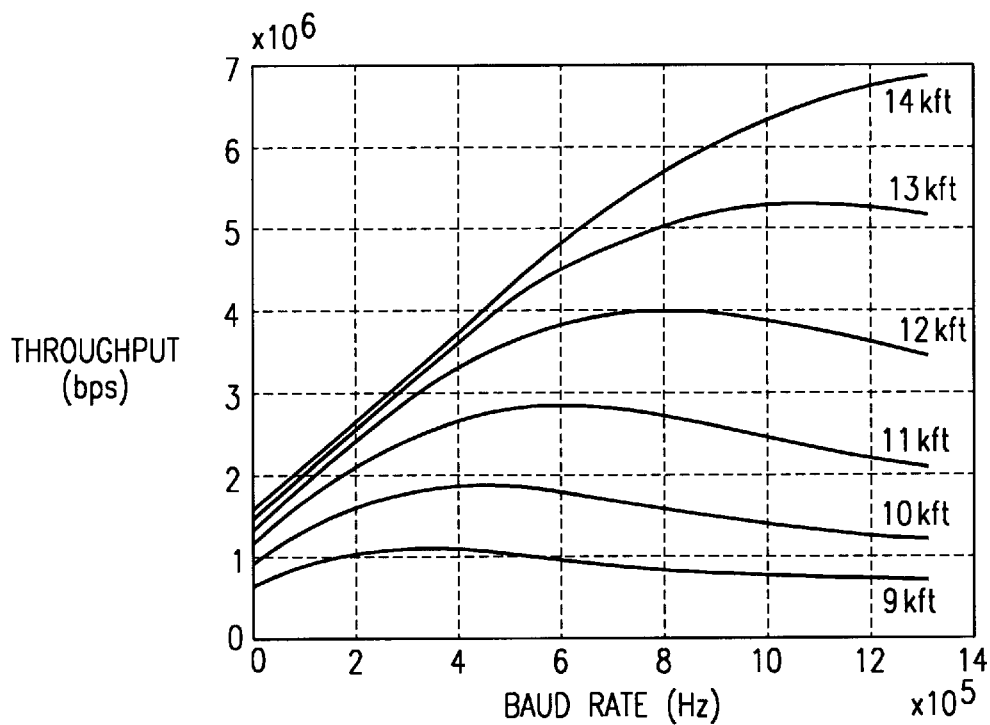
FIG. 3 shows optimal baud rates with HDSL NEXT (200 KHz)

FIG. 3 shows transmission throughputs under different baud rates for 26 gauge twisted pair loops but for a lower corner frequency of about 200 KHz (close to that proposed by Broadcom).

Figure 4:
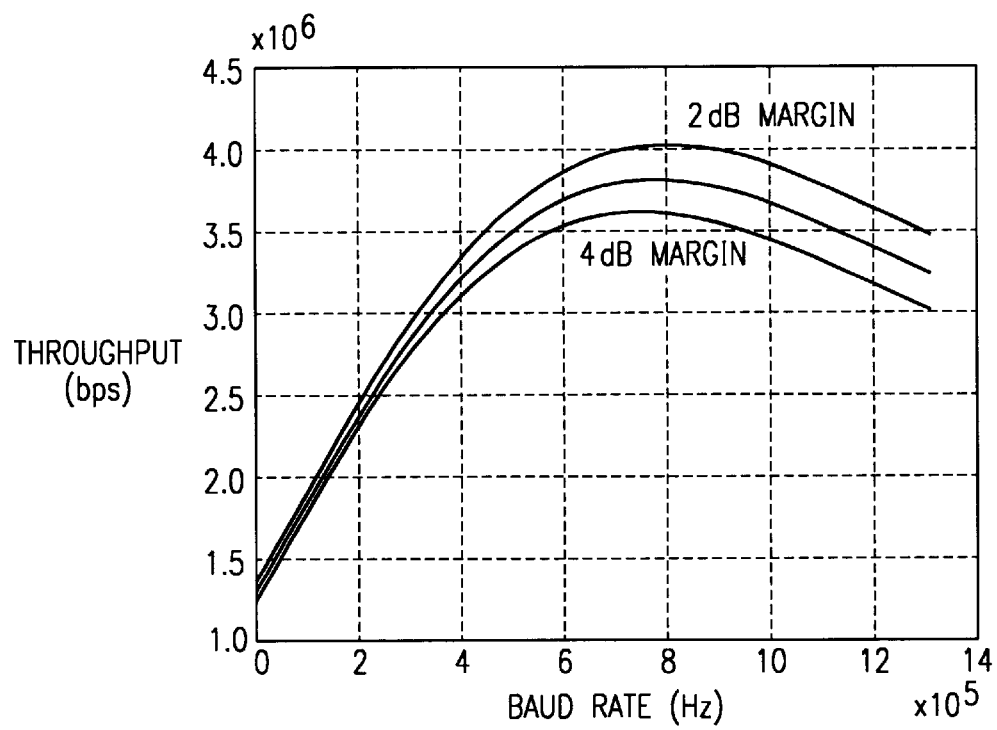
FIG. 4 shows an optimal baud rate margin.

According to some field data, about ⅓ of the local loops have a length longer than 9 kft. Potentially selected baud rates should be equally distributed to cover loops with different lengths. W. Y.Chen and D. L.Waring, *Applicability of ADSL to Support Video Dial Tone in the Copper Loop*, IEEE Communications Magazine, vol. 32, No. 5, pp. 102–109, May 1994. FIG. 4 depicts baud rates spaced 200 KHz apart for a performance within 0.5 dB of the optimal baud rate.

The top curve in FIG. 4 has a performance margin of 2 dB, the middle one 3 dB, and the bottom one 4 dB. Comparing the top two curves, it may be seen that there is a performance penalty of about 1 dB for the top curve to have the same throughput as the optimal performance of the middle curve while operating on a baud rate of about 200 KHz below the optimal baud rate for that particular loop. If baud rates are 200 KHz apart, selecting between neighboring baud rates achieves a performance degradation of less than 0.5 dB when compared with the optimal performance.

A Set of Baud Rates

The baud rates should be $$f_{B_i} = i f_{B_1}$$

for i=1, 2, 3, ..., where $f_{B_1}$ is the minimum baud rate, and the center frequency, $f_{c_i}$, is at $$f_{C_i} = f_{B_1} + \frac{1}{2}f_{B_i} = \frac{2+i}{2}f_{B_1} = \frac{2+i}{2i}f_{B_i}$$

Table 3 shows the set of baud rates with $B_1$=200 KHz.

TABLE 3

A Representative Set of Baud Rates

| $B_i$ (KHz) | $C_i$ (KHz) |
|---|---|
| 200 | 300 |
| 400 | 400 |
| 600 | 500 |
| 800 | 600 |
| 1000 | 700 |
| 1200 | 800 |

Carrier Frequency and Baud Rate Relationship

With the above set of baud rates, $$f_{C_i} = \frac{2+i}{2i}f_{B_i}$$

Table 4 shows the relationship between $f_{c_i}$ and $f_{B_i}$ for i=1, 2, 3, 4, 5, and 6, where $f_{c_i} = x f_{B_i}$.

TABLE 4

A Representative Set of Baud Rates

| i | x |
|---|---|
| 1 | 3/2 |
| 2 | 1 |
| 3 | 5/6 |
| 4 | 3/4 |
| 5 | 7/10 |
| 6 | 2/3 |

Recognizing that the modulation process can be expressed as $$K(n) = e^{j2\pi f_C n \frac{1}{f_B}}$$

one has $$K(n)_1 = e^{j3n\pi} = (-1)^n$$
$$K(n)_2 = e^{jn\pi} = (-1)^n$$
$$K(n)_3 = e^{j\frac{5}{3}n\pi}$$
$$K(n)_4 = e^{j\frac{3}{2}n\pi}$$
$$K(n)_5 = e^{j\frac{7}{5}n\pi}$$
$$K(n)_6 = e^{j\frac{4}{3}n\pi}$$

W. Y. Chen, G. H. Im, and J. J. Werner, *Design of Digital Carrierless AM/PM Transceivers*, AT & T and Bellcore T1E1 Contribution, T1E1.4/92-149, August 1992.

Variables Affecting the Transmission Throughputs

The transmission throughput of a Rate Adaptive Digital Subscriber Line (RADSL) depends on the baud rate, the constellation size, and the frame/coding overhead. In other words, the transmission throughput of a RADSL can be adjusted by selecting proper values of these three variables while maintaining a near optimal taransmission performance. In the case that the maximum throughput is not necessary, only a part of the payload bits will be used.

Baud Rate

The transmission performance can be maintained to within a half dB of that of the optimal performance if the baud rates are spaced 200 KHz apart with the lowest baud rate having a center frequency of about 350 KHz.

Constellation Size

To maintain a less than half dB of performance degradation from the optimal, constellation sizes with a precision of a ⅙ bit are presently preferred. There are several ways to realize a fractional bit constellation.

Throughput Sten Sizes

With the proposed baud rates and fractional bit constellation sizes, the transmission throughput step sizes are 200/6=33 kbps at a baud rate of 200 KHz, 400/6=66 kbps at a baud rate of 400 KHz, 600/6=100 kbps at a baud rate of 600 kbps, 800/6=133 kbps at a baud rate of 800 kbps, 1000/6=166 kbps at a baud rate of 1 MHz, and 1200/6=200 kbps at a baud rate of 1.2 MHz.

A Frame Structure for Flexible Throughput Step Size

Figure 5:
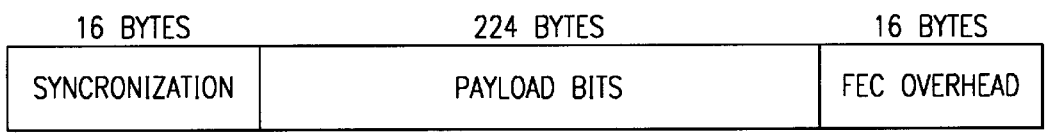
FIG. 5 is a general frame structure.

To avoid the possibility of a fractional bit in a frame, the frame size can be based on a group of 6 bauds. For a maximum constellation size of 8 bits per symbol and a minimum constellation size of 2 bits per symbol, this group can have a maximum of 48 bits or a minimum of 12 bits. To fit a $2^8$=256 based Reed-Solomon code, we can combine 40 to 160 groups together to form a FEC frame of size 240 bytes with 16 bytes available for synchronization and other purposes for an over all frame size of 256 bytes, as depicted in FIG. 5.

Figure 6:
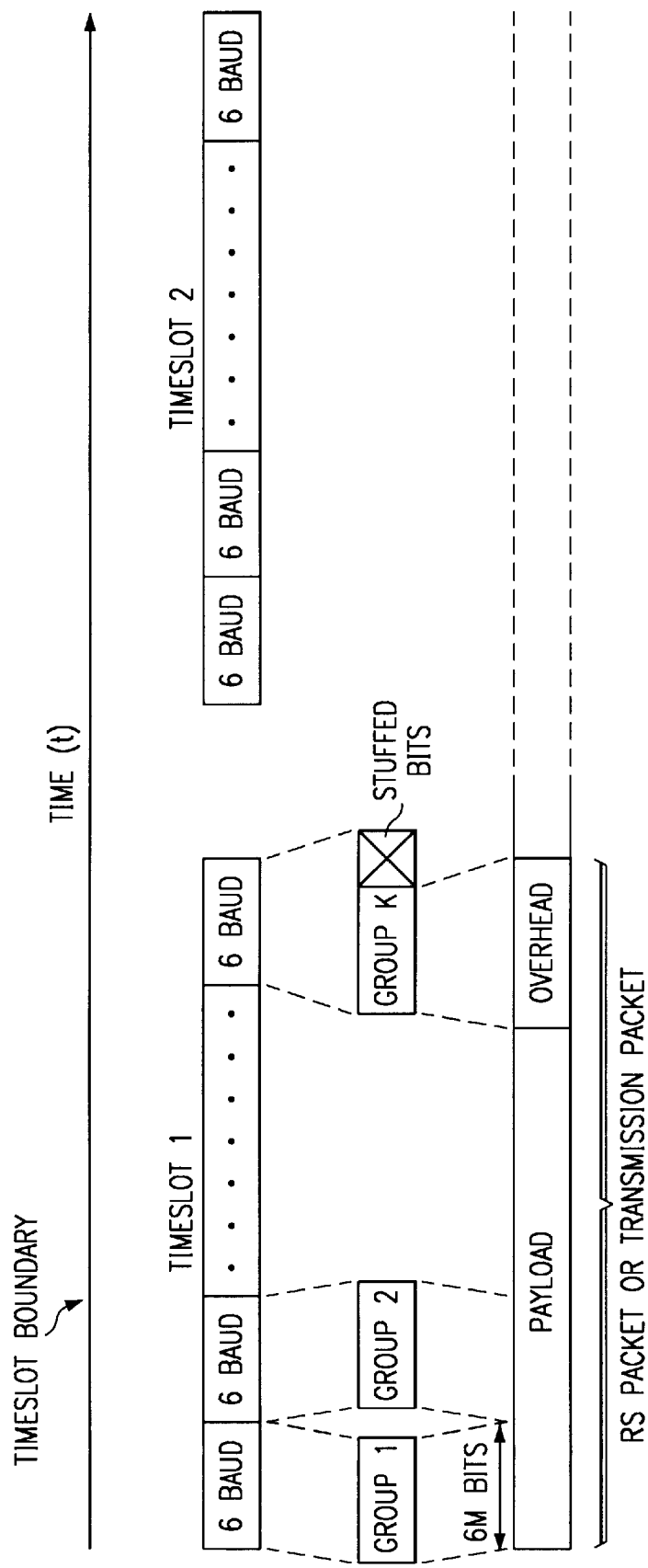
FIG. 6 is an alternative frame structure.

A further possible frame structure that supports fractional bit-per-symbol transmission is shown in FIG. 6. Data to be transmitted is placed in the payload portion of consecutive transmission packets. System synchronization and maintenance data is placed in a portion of the packet, and then forward error-correction (FEC) bytes are added to complete the transmission packets.

Sets of 6M bits at a time are taken from the transmission packet to form groups of 6M bits. If the bits at the end of the packet number are less than 6M, then dummy bits should be "stuffed" into the last group. The number of groups in a transmission frame is $$\left\lceil \frac{\text{\#bits in transmission packet}}{6M} \right\rceil$$

where ⌈ ⌉ is the ceiling operator that means round up to the nearest integer. Each group of bits is mapped to a set of 6 symbols (or equivalently 6 baud) based on the previously discussed fractional bit representation. The number of bits in the group determine the density of the symbol constellations, M, according to the relationship $$M = \frac{\text{\#bits in a group}}{6}.$$

Sets of 6 symbols constitute a time-slot of data symbols—the time slot length is a multiple of 6 symbols. To ensure proper synchronization and frame alignment, rate adaptation should be performed only at time-slot boundaries.

An Optimal Baud Rate and Constellation Size Identification Procedure

Assuming the transmission environment, i.e. twisted pair loop channel loss and receiver front end noise, is relatively stable, the optimal baud rate can be identified in the initialization process.

Using the 4 CAP/QPSK constellation, the Minimum Mean Square Error (MMSE) at every baud rate is identified through the equalizer convergence process. The Transmission throughputs are estimated according to these MMSEs:

$$R_i = \frac{1}{T}\log_2\left(\frac{3}{5.33^2 MMSE_i} + 1\right)$$

The baud rate and associated constellation size corresponding to the maximum transmission through put are selected for the subsequent transmission.

In conjunction with a set of baud rates, a ⅙ bit constellation size can achieve a performance within 0.5 dB to the optimal performance this results in a variable step size ranging from 33 kbps to 200 kbps for baud rates from 200 KHz to 1.2 MHz, respectively. The optimal baud rate and constellation size can be identified though the convergence of the receiver channel equalizers on all baud rates using a 4 CAP or QPSK based training sequence.

An Operating Procedure for CAP-RADSL

This section describes a procedure for selecting the optimum baud rate and constellation density for a CAP-RADSL system. The procedure depends on an optimality criterion for conditionally updating operating parameters. The procedure also supports fractional constellation mappings.

Figure 7:
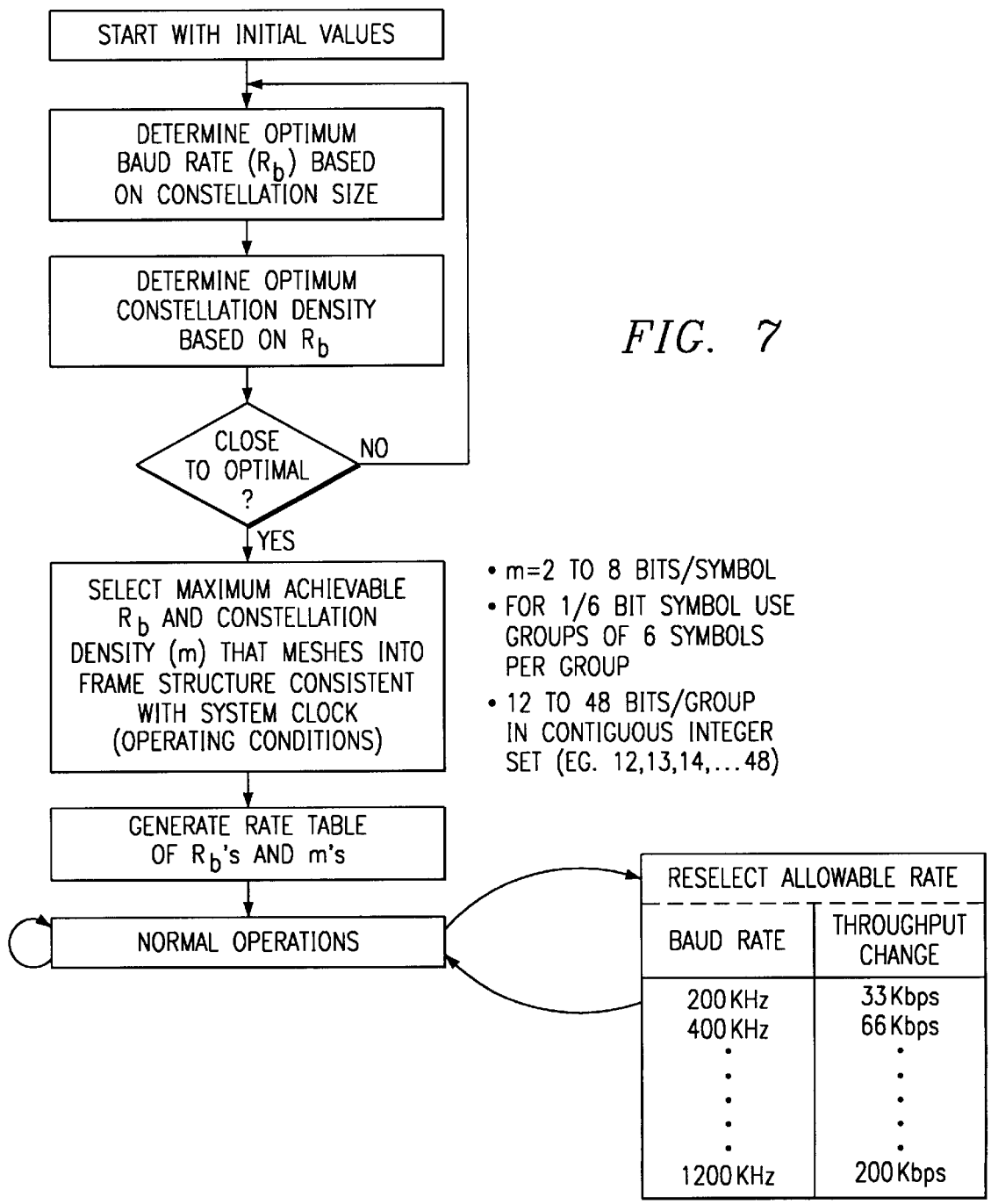
FIG. 7 is a method for operating a RADSL system.

A flow diagram for the procedure is shown in FIG. 7. A set of initial values for transmission parameters are evaluated to determine the "optimal baud rate $R_b$. Based on $R_b$ and the channel conditions, an optimal constellation density, M, is determined. An optimality criterion is then used to determine how close the determined operating point is to optimum. If the operating point is not close enough, the optimum baud rate $R_b$ is recomputed using the new value for constellation size. Using the new value of $R_b$, a new value for constellation size is computed. The optimality check is applied again, and iterations continued until convergence to the desired near-optimal values. Once past the optimality check, the baud rate $R_b$ and constellation size must be analyzed to make sure they allow an even meshing of the system clock, frame structure, and data throughput with the channel rate. If not, then the constellation size and/or baud rate should be reduced until network synchronization is achieved.

Using methods similar to those above, the CAP-RADSL system should generate a rate table of $R_b$'s and M's that can be used for rate adaptation during normal operations. This information can be compactly stored as a collection of throughput changes corresponding to different possible baud rates. Alternatively, the entire collection of rate possibilities can be stored. A further alternative is to only store a collection of rate possibilities close to the initial operating point.

Normal operation is entered, but occasionally new rates can be selected from the precomputed table as deemed necessary to make the system rate adaptive.

Although the present invention and its advantages have been described in detail, it should be understood that various changes, substitutions and alterations can be made herein without departing from the spirit and scope of the invention as defined by the appended claims.

What is claimed is:

1. A table-based method of operating a CAP-RADSL system, to allow for systematic rate adaptation, comprising the steps of:

(a) providing a preselected baud rate
   (b) determining throughput increments of said system based on the smallest fractional increase in constellation density and preselected baud rate, and
   (c) adapting an appropriate baud rate responsive to steps (a) and (b) from a table entry.

2. The method of claim 1 wherein the set of baud rates produces performance within a specified range of an optimal performance based on a preselected set of operating conditions.

3. The method of claim 2, further comprising, selecting near-optimal constellation density using groups of fractional-bit constellations in a manner to achieve a maximum throughput.

4. The method of claim 3, further comprising, maintaining synchronization to a master clock and a preselected framing structure.

5. The method of claim 4, further comprising, employing a bit stuffing method that maintains alignment and network synchronization and avoids fractional symbols falling across frame boundaries.

* * * * *